Sept. 21, 1971  G. M. PLATZ ET AL  3,606,822
METHOD AND APPARATUS FOR PRODUCING A FLAT-BOTTOM PLASTIC BAG
Filed Jan. 12, 1970  3 Sheets-Sheet 1

INVENTORS
GERALD M. PLATZ
JAMES B. HONN
BY Allen A. Meyer, Jr.
ATTORNEY

Sept. 21, 1971     G. M. PLATZ ET AL     3,606,822
METHOD AND APPARATUS FOR PRODUCING A FLAT-BOTTOM PLASTIC BAG
Filed Jan. 12, 1970     3 Sheets-Sheet 2
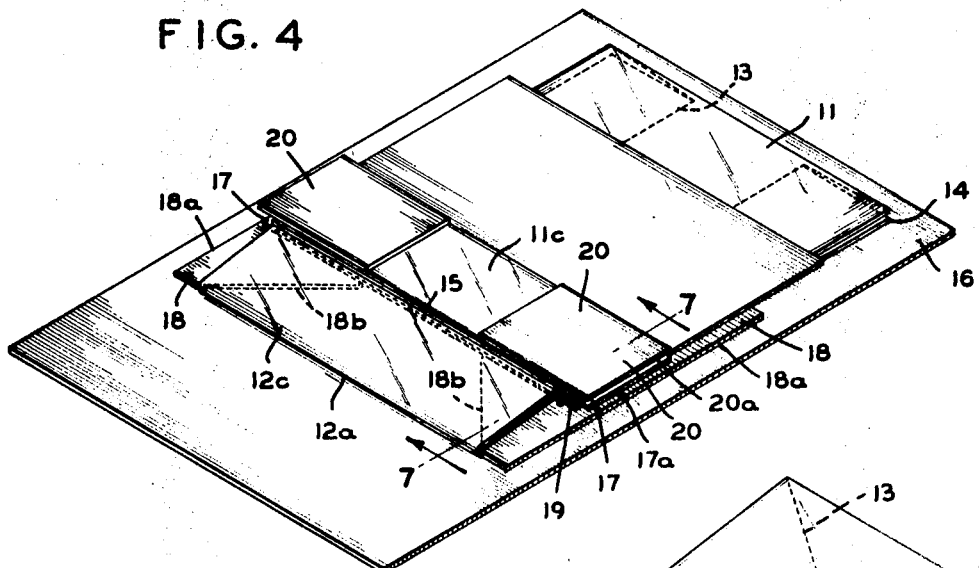
FIG. 4
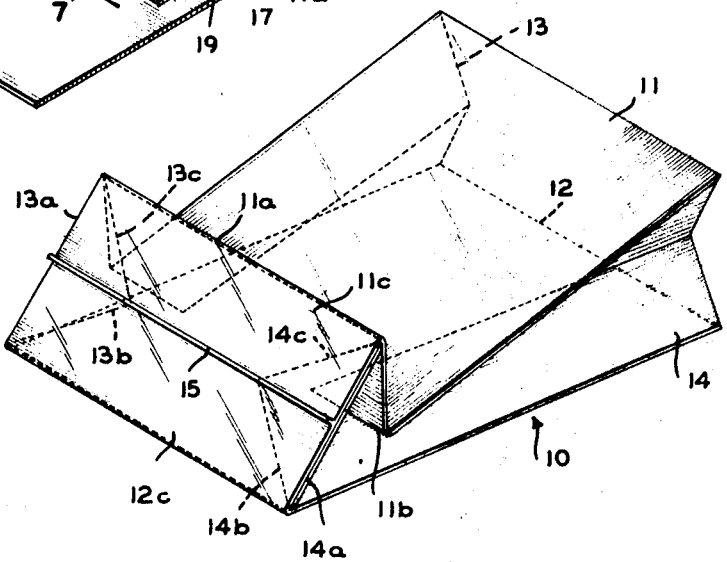
FIG. 5
FIG. 6
FIG. 7
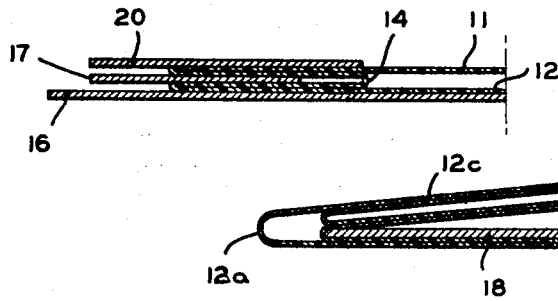
INVENTORS
GERALD M. PLATZ
JAMES B. HONN
BY *Allen A. Meyer, Jr.*
ATTORNEY

INVENTORS
GERALD M. PLATZ
JAMES B. HONN

BY *Allen A. Meyer, Jr.*

ATTORNEY

United States Patent Office 3,606,822
Patented Sept. 21, 1971

3,606,822
METHOD AND APPARATUS FOR PRODUCING A FLAT-BOTTOM PLASTIC BAG
Gerald M. Platz, Champaign, and James B. Honn, Arcola, Ill., assignors to National Distillers and Chemical Corporation, New York, N.Y.
Filed Jan. 12, 1970, Ser. No. 2,020
Int. Cl. B31b *49/04*
U.S. Cl. 93—35SB                                           8 Claims

ABSTRACT OF THE DISCLOSURE

A flat-bottom plastic bag produced from an extruded length of gusseted thermoplastic material and a method for the production thereof including the steps of sealing and severing a length of such material to provide a closed bottom; retaining the major portion of said sealed tube including the open mouth against longitudinal movement; grasping opposed edges of the top wall of said tube adjacent the sealed bottom; lifting the grasped top wall to a plane immediately above that of the retained portion of the tube; moving the grasped portion of the tube toward the open mouth of the bag a predetermined distance to also carry the bottom wall of the tube therewith; and folding the moved portion of the tube to create a finished bag having a sustaining flat-bottom portion when opened.

---

This invention relates to a novel bag produced from suitable thermoplastic material having inherent heat-sealing characteristics, such as polyethylene, polypropylene, and the like, and to the method of manufacture thereof.

Essential requirements of bags of the character with which we here are concerned are that the bags must include a substantially rectangular and flat bottom surface and the gauge or thickness of the thermoplastic sheet material employed must be such that the bag walls will be self-sustaining and the bag will stand erect, resting upon its flat bottom, when in opened position.

An important end use of such bags is as a carry-out bag for the replacement of paper bags commonly used in the grocery and supermarket industries. Present practices in these fields require that the paper bags utilized be of double-walled manufacture, or that two bags be employed, one inside the other, to eliminate the hazards of bottom breaks occasioned by over-loading, wet groceries, and other influences that provide stresses or conditions beyond the tolerance of the paper utilized. Mounting costs in connection with the provision of paper carry-out bags which will withstand satisfactorily the adverse conditions referred to hereabove present continually increasing problems and the present invention is directed to the solution thereof.

It is a major object of the present invention to provide a plastic bag which will be moisture-proof and will have adequate wall strength to withstand internal stresses when the bag is loaded.

It is a further object of the present invention to provide a novel plastic bag having a flat, substantially rectangular bottom surface, whereby the bag may be opened readily and will stand erect to permit the convenient utilization thereof along a check-out and filling line.

A still further object of the invention is the production of a bag of the character with which we here are concerned from a continuous length or tube of heat-sealable thermoplastic material which has been extruded and flattened to provide a gusset in each side edge thereof, external transverse sealing and severance between adjacent bags being accomplished after the formation of such gussets.

It is an additional important object of the invention to provide a bag of the character under discussion which may be produced with particular economy, can compete successfully with prior-art paper bags and can be used with particular facility in grocery and supermarket operations and the like.

Such bags have numerous other advantages since these may be produced from transparent stock whereby the purchaser and the employee may see each item placed therein, thereby speeding up the check-out operation and, when emptied, these bags may function for the disposition of debris, of whatsoever character, with great advantages over paper bags when used for such purposes.

Further objects and advantages of the invention will be readily apparent from the following description taken in conjunction with the accompanying drawings, wherein:

FIG. 4 is a perspective view of the sealed tube, similar to FIGS. 2 and 3, illustrating the third step in the production of the flat-bottom bag of the present invention;

FIG. 5 is a perspective view of the finished bag in partially opened condition;

FIG. 6 is a fragmentary sectional view on an enlarged scale taken on the line 6—6 of FIG. 3;

FIG. 7 is a fragmentary sectional view, also on an enlarged scale, taken on the line 7—7 of FIG. 4;

Figure 1:
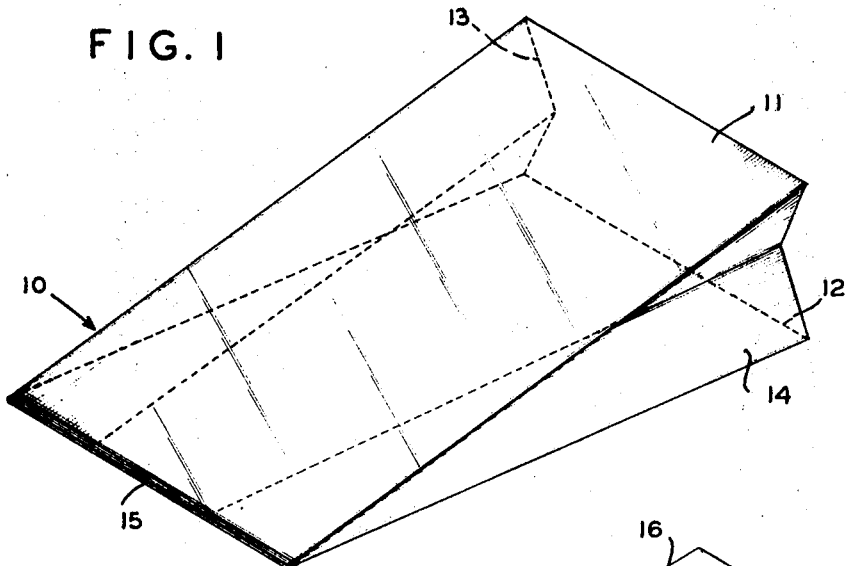
FIG. 1 is a perspective view of a partially opened plastic envelope or tube produced from an extruded length of thermoplastic seamless tubing having a gusset in each longitudinal edge thereof and heat sealed transversely across the full width thereof, including the opposed gussets, to provide a sealed bottom edge.

As shown in the drawings, particular reference being had to FIG. 1, the tube 10 of the present invention has been heat-sealed transversely along the bottom edge and severed from a length of seamless thermoplastic tubing produced by an extrusion process and flattened as is well known in this art. The severed bag includes a front wall 11 and a rear wall 12 united along the longitudinal edges thereof by gussets 13 and 14 also as is well known in this art. The thermoplastic material is heat-sealed transversely, from edge to edge thereof as indicated at 15, and severed immediately beyond the seal 15, thereby providing a bottom closure for the initial bag and an open mouth edge for the next adjacent bag, the invention contemplating the successive production of bags from a continuous length of tubing. It will be noted that the transverse seal 15 securely unites or welds the bottom edges of the front and rear walls or panels 11 and 12 to each other and that this seal also includes the gusseted portions 13 and 14. Thus, in the central portion of the sealed tube there are two layers of thermoplastic material, constituting the front and rear walls of the bag; however, in the outer portions of the seal 15 there are four layers of thermoplastic material, the two opposed layers of each gusset 13 and 14 being sealed between the front wall 11 and the rear wall 12.

Figure 2:
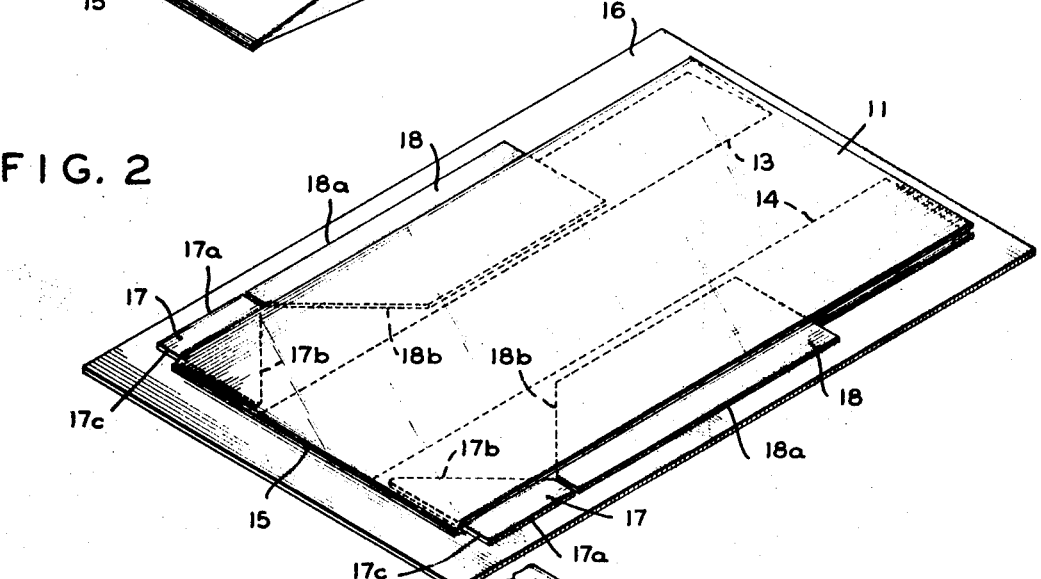
FIG. 2 is a perspective view of the sealed tube of FIG. 1, illustrating a first step in the production of the flat-bottom plastic bag of the present invention.
Figure 3:
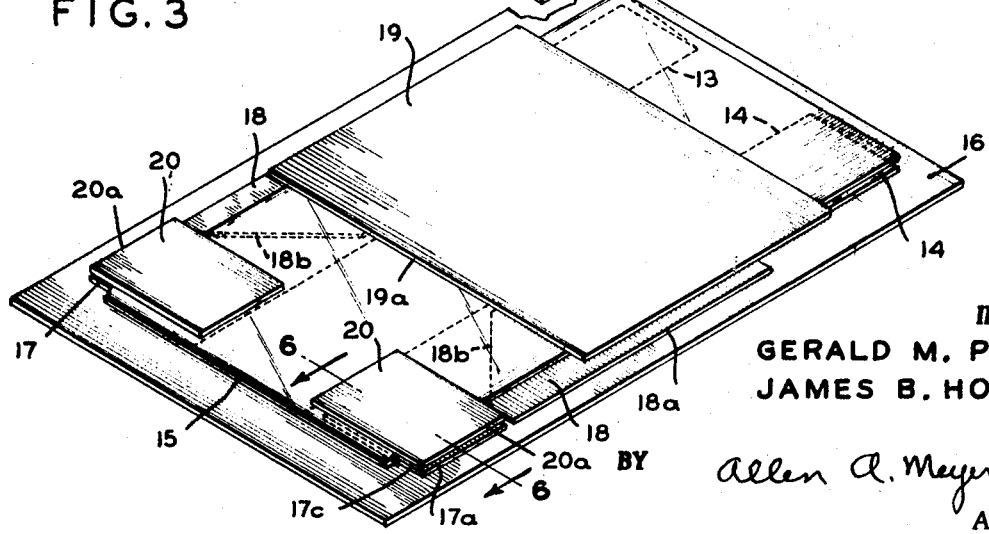
FIG. 3 is a perspective view of the sealed tube, similar to FIG. 2, illustrating the second step in the production of the flat-bottom bag of the present invention.

The bottom-sealed bag 10 is then placed upon a supporting plate or platform 16, as shown in FIGS. 2, 3 and 4 of the drawings, and a pair of forming plates 17 and 18 are positioned in each of the gussets 13 and 14. Each of these forming plates is of substantially trapezoidal configuration and, desirably, the length of the forming plate 18, as defined by the outer edge 18a, is of substantially greater extent than the forming plate 17 as defined by the edge 17a. Further, each forming plate 17 includes an angularly disposed inner edge 17b having an angular relationship on the order of 45° to the transverse edge of the plate 17 and each forming plate 18 has a complementarily located and angularly disposed inner edge 18b, the forming plates 17 and 18 being positioned within the gusset with the angularly disposed edges 17b and 18b in opposed relationship for a purpose to be described more fully hereafter. The location or positioning of each forming plate 17 is at the base of the associated gusset with the edge 17c in substantially direct contact with the line of seal between the gusset and the front and rear walls or panels 11 and 12 of the bag. The dimensions of each of the forming plates are critical, particular reference being had to the extent of the edge 17a thereof, the length of the edge 17a being on the order of 50% of the width of the flat bottom which is to be produced in the plastic bag under discussion.

Clamping means is provided to securely retain the bag 10 upon the supporting table or platform during the manipulation of the bag to create the flat bottom with which we here are concerned. As shown more particularly in FIGS. 3, 8 and 9 of the drawings, a single clamping plate 19 is positioned across the top of the bag and this clamping plate overlies both of the opposed forming plates 18. Thus, when pressure is applied to the upper surface of the clamping plate 19, it being understood that the platform 16 is supported in fixed position, that portion of the bag 10 that is beneath the clamping plate 19 and extending to the open mouth thereof and also including the forming plates 18 will be retained firmly in position and any possibility of movement or distortion in any direction will be precluded. Further, the edge 19a of the clamping plate 19 is positioned immediately adjacent the base of the angularly inclined edge 18b of the forming plate 18.

A separate clamping plate 20 is utilized for each of the forming plates 17 and, desirably, the extent or dimension of each of the clamping plates 20, as defined by the edge 20a thereof, is identical to that of the edge 17a of each forming plate 17. Thus, when pressure is applied simultaneously to the upper surface of the clamping plate 20 and the lower surface of the forming plate 17, the front wall 11 of the bag and the upper portion only of the associated gusset will be grasped securely and retained therebetween.

Figure 8:
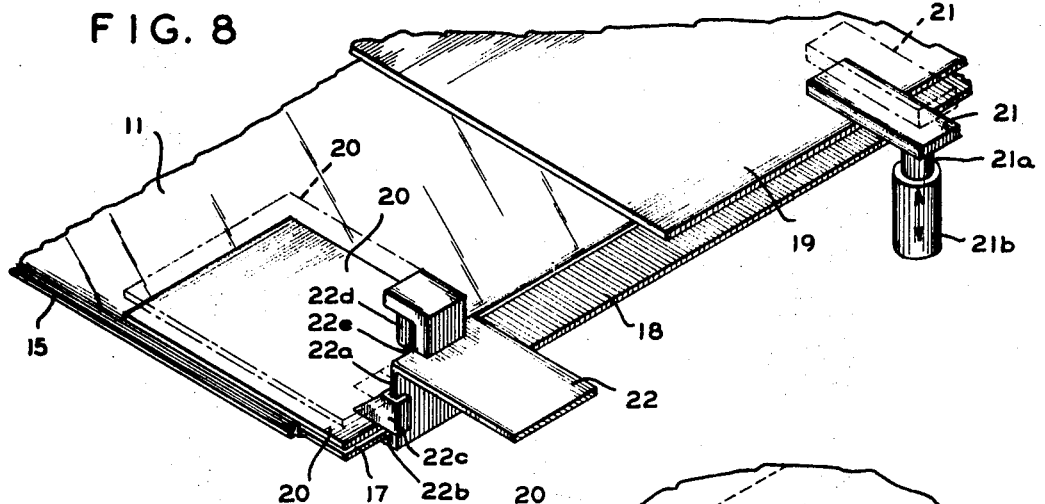
FIG. 8 is a fragmentary perspective view illustrating one form of clamping or grasping mechanism operable to move the lower portion of the tube from the position illustrated in FIG. 3 to that of FIG. 4.
Figure 9:
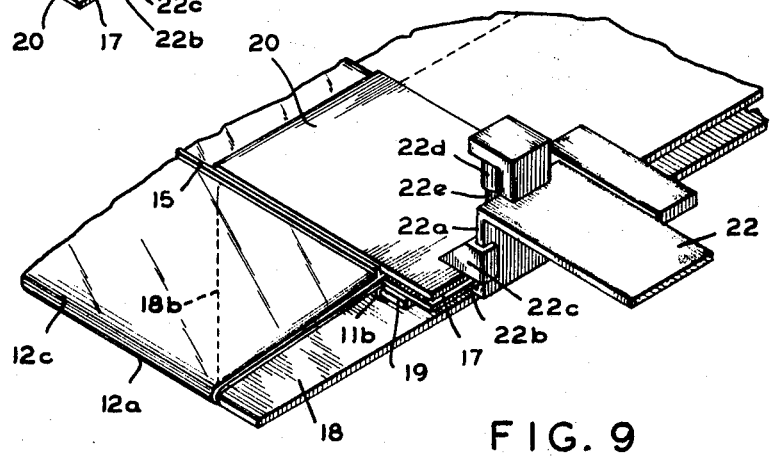
FIG. 9 is a fragmentary perspective view illustrating the clamping mechanism and lower portion of the tube moved to the position illustrated in FIG. 4 of the drawings.
Figure 10:
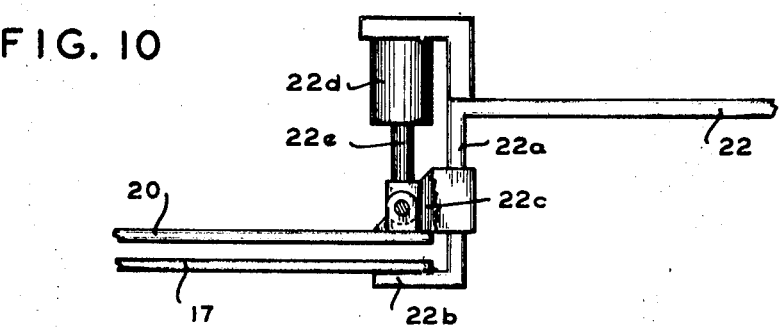
FIG. 10 is a side elevational view, parts being broken away, of the bag grasping and moving mechanism.

Any suitable form of clamping means may be provided and appropriate mechanism has been illustrated diagrammatically in FIGS. 8 through 10 of the drawings. As shown in FIG. 8 of the drawings, opposed arms 21, one located at each side of the platform 16, supported upon posts 21a associated with hydraulic cylinders or the like 21b, may be employed to exert downward pressure upon the clamping plate 19 and securely retain the bag between the clamping plate 19 and the platform 16. In this figure of the drawings, the solid lines disclose the arm 21 in locked position while the broken lines disclose the arm 21 in elevated position with clamping pressure having been removed.

A slightly different form of clamping mechanism is required in connection with the clamping plates 20 and forming plates 17 where manipulative steps with movement of the bottom portion of the bag are required. One form of such mechanism may include a horizontally disposed arm or lever 22 including a vertically disposed portion 22a terminating at the lower extremity thereof in a supporting flange portion 22b. Pressure fingers, or the like, 22c are slidably mounted upon the vertically disposed portion 22a and a hydraulic cylinder 22d and piston 22e may be employed for moving the pressure fingers from upward disengaging position to lowered clamping position. It will be understood that the flange portion 22b is inserted beneath the forming plate 17 and that when pressure is applied to the upper surface of the clamping plate 20 by the pressure fingers 22c, the front wall 11 of the bag and the upper portion of the associated gusset will be firmly grasped and retained between the plates 17 and 20.

A continuous manufacturing process is contemplated where the extruded, gusseted, and flattened tube will be fed to a sealing and severance station and each sealed and severed bag will be delivered to a bag bottom forming station where the bag will be delivered to the platform or table 16, the forming and clamping plates 17 through 20 will be positioned automatically and the clamping devices 21 and 22 will be activated to operative engagement with the bag.

At this point it is required only that the bottom portion of the bag be moved longitudinally in a direction toward the open mouth of the bag so as to overlie the lower portion of the remainder of the bag.

It will be understood that there are opposed clamping devices 22. One of these is engaged with a forming plate 17 and a clamping plate 20, the forming plate 17 having been inserted in the gusset 13 and the top wall 11 of the bag 10 and the upper wall of the gusset 13 being grasped and retained securely between the plates 17 and 20. The other or opposed clamping device also is engaged with a forming plate 17 and a clamping plate 20; however, this forming plate has been inserted in the gusset 14 and the top wall 11 of the bag and the adjoining upper wall of the gusset 14 are being retained between the plates 17 and 20. Thus, each clamping device engages an edge of the top wall and the associated gusset portion and, as the next step in the present process it is required that the clamping devices 22 be moved a slight distance in a vertical direction to a plane immediately above that of the upper surface of the clamping plate 19.

The clamping devices 22 are then moved longitudinally toward the open mouth of the bag to the position shown in FIGS. 4 and 9 of the drawings. This will create fold lines 11a and 11b in the front wall of the bag and a fold 12a in the bag rear wall 12; simultaneously therewith, the bag is provided with a flat bottom constituted by the panel 11c of the bag front wall which extends from the fold 11a to one side of the heat seal 15 and the complementary panel 12c of the bag rear wall which extends from the fold 12a to the opposite side of the heat seal. Triangularly shaped double-layer corner portions 13a and 14a are created simultaneously in each of the gussets 13 and 14 and these corner portions lie in abutting relationship with respect to the panels 11c and 12c that constitute the flat bottom of the bag. The angularly disposed edge 13b of the gusset corner portion 13a is created and determined by contact with the angular edge 18b of the forming plate 18; similarly, the angularly disposed edge 14b of the gusset corner portion 14a is created by contact with the edge 18b of the opposed and associated forming plate 18. The angularly disposed edge 13c of the gusset corner portion 13a is created and determined by contact with the angular edge 17b of the forming plate 17; similarly, the angularly disposed edge 14c of the gusset corner portion 14a is formed by contact with the angular edge 17b of the opposed associated forming plate 17. Upon completion of the folding or bottom-creating operation, pressure upon the clamping plates 19 and 20 is released and the forming plates 17 and 18 are retracted so as to clear the bag and returned to initial position together with the clamping plates 20. Simultaneously therewith, the bag surface clamping plates are lifted slightly and suitable air jets may be employed to move the bag from the former and through properly adjusted nip rolls (not shown) to press or flatten the newly formed folds. It will be understood that stop means (also not shown) may be provided to insure accurate positioning of a sealed and severed bag as it is delivered to the forming station; in like manner, stop means may be provided to limit the longitudinal movement of the clamping mechanism 22.

In practice, highly satisfactory flat-bottom plastic bags have been produced from blown tubular film having a thickness or gauge on the order of 3 mils. Where the tube as blown has a circumference on the order of 36¼", a bag having a width of 11½" with 3⅜" lay-flat gussets is particularly suitable for present purposes. The sealed and severed tube, prior to the bottom-forming operation, has a length on the order of 21" and, when bottom forming will have been completed, a flat bottom having a width of 11½" and a depth of 6¾" (approximately twice the depth of the lay-flat gusset) is created. Such a bag can be snapped open, as is customary in bagging operations, with particular ease and, when provided from 3-mil film, will have self-sustaining walls and will remain open and erect during the filling operation.

Where the heat seal can be accomplished in 1½ seconds, the film blowing, gusseting and flattening, and bag forming can be completed in line as a continuous operation. Alternately the gusseted flat tube may be provided in roll form or sealed and severed lengths may be fed to the apparatus from a stacked supply thereof. While the continuous method of operation will make for improved economy, under any of these circumstances a superior flat-bottom plastic bag can be provided with sufficient economy to compete more than favorably with paper bags manufactured in accordance with present-day practices.

The plastic bag will have greater strength, complete resistance to rupture under stresses vastly in excess of those to be expected under normal conditions, and will be fluid-proof as against both internal and external adverse influences. Bags of this character may be manufactured with equal facility through a particularly wide range of sizes with appropriate adjustment of the apparatus to compensate for bag width, length and gusset depth.

It will be obvious to those skilled in the art that various changes may be made in the invention without departing from the spirit and scope thereof. Thus, the invention is not considered limited by that which is shown in the drawings and described in the specification and reference is had to the claims for summaries of the essentials of the invention, novel features of construction, and novel methods of operation, for all of which protection is desired.

Any thermoplastic film having satisfactory properties of strength, stiffness and heat sealability can be used in accordance with this invention, such as polyolefins, polyamides (nylon), polyvinyl chlorides, polyvinylidene chlorides, polyesters, polycarbonates, and polystyrene and the like. Polypropylene and polyethylene are preferred. Linear high density polyethylene having a density in the range of about 0.945 to 0.960 is especially preferred.

Typical properties of films found to be satisfactory for the present invention are:

Modulus, p.s.i. (1% secant): (ASTM D882–67)
M.D. _____ 110,000–175,000
T.D. _____ 140,000–220,000
Tensile, p.s.i.:
M.D. _____ 3,000–6,000
T.D. _____ 2,000–5,000
Elongation, percent:
M.D. _____ 300–600
T.D. _____ 140–700

The thickness of the film is not critical and will vary with the other properties depending on the desired stiffness and strength of the bag. Economy will be another factor which determines how thick the film will be. Typical thicknesses are in the range of about 1.5 to about 5.0 mils.

What is claimed is:

1. The method of producing a flat-bottom bag from thermoplastic material which includes the steps of: providing a length of flattened heat-sealable tubular material having top and bottom walls and united along each longitudinal edge by a gusset, said length having been heat sealed transversely adjacent one extremity to provide a bag having a closed bottom and an open mouth; clamping the open mouth portion of the bag to prevent longitudinal movement thereof; inserting forming means in each gusset immediately adjacent the sealed bottom of the bag; clamping opposed portions of the bag top wall and gusset to said forming means; elevating said clamped portion to a horizontal plane above that of the remainder of the bag; advancing said clamped portion in a direction toward the open mouth of the bag to create a flat bag bottom portion; and applying pressure to said advanced portion to create transverse fold lines defining said bag bottom.

2. The method of producing a flat-bottom bag from thermoplastic material which includes the steps of: providing a flattened tube of heat-sealable material having top and bottom walls and united along each longitudinal edge by a gusset; heat sealing said tube transversely and severing said tube adjacent the transverse seal to provide a bag having a closed bottom and an open mouth; advancing said sealed bag to a forming station; inserting aligned first and second forming means in each of said gussets adjacent the closed bottom of said bag; clamping the open mouth portion of the bag to prevent longitudinal movement thereof; clamping opposed portions of the bag top wall and gusset to the associated first forming means; elevating said clamped portion to a plane above that of said second forming means; advancing said clamped portion in a direction toward the open mouth of the bag to create a flat bag bottom portion; and applying pressure to said advanced portion to create transverse fold lines defining said bag bottom.

3. The method of claim 2 which also includes the steps of releasing the clamping pressure adjacent the bag mouth and the advanced portions of the bag and applying an air stream to the bag mouth to deliver the bag to a folding station.

4. The method of claim 2 in which the clamped bag portions are advanced a distance substantially equal to the depth of one of the bag gussets.

5. Apparatus for producing a flat-bottom bag from a length of flattened heat-sealable tubular material having top and bottom walls and united along each longitudinal edge by a gusset, said length having been heat sealed transversely adjacent one extremity to provide a bag having a closed bottom and an open mouth, said apparatus including: a supporting plate; means for clamping the open mouth portion of the bag to said supporting plate; first and second aligned forming plates for insertion in each gusset, the trailing edge of said first forming plate being positioned immediately adjacent the bag bottom seal; opposed clamping means for clamping opposed portions of the bag top wall and underlying gusset to the associated first forming means; means for elevating said opposed clamping means and clamped bag portions to a horizontal plane above that of said inserted second forming plates; means for advancing said opposed clamping means and clamped bag portion in a direction toward the open mouth of the bag to create a flat bag bottom portion; and pressure means for creating transverse fold lines defining said bag bottom.

6. Apparatus as set forth in claim 5 where each of said first and second forming plates is of trapezoidal configuration and has a transverse dimension at least as great as the depth of the bag gusset; the leading edge of each first forming plate being outwardly and angularly inclined, the angular relationship being on the order of 45°, and the opposed edge of each second forming plate is reversely inclined.

7. Apparatus as set forth in claim 6 where the length of the inserted portion of each of said first forming plates is substantially identical to the depth of the bag gusset and the length of each of said second forming plates is substantially greater than that of said first forming plates.

8. Apparatus as set forth in claim 6 where the extent to which the opposed movable clamping means are advanced is substantially equal to the depth of one of the bag gussets.

9. The flat-bottom plastic bag produced by the process of claim 1.

References Cited

UNITED STATES PATENTS

| | | | |
|---|---|---|---|
| 2,392,206 | 1/1946 | Waters | 93—35SB |
| 3,317,117 | 5/1967 | Goodwin | 93—35SB |

BERNARD STICKNEY, Primary Examiner

U.S. Cl. X.R.

93—8; 229—58